(12) United States Patent
Hampp et al.

(10) Patent No.: US 8,023,168 B2
(45) Date of Patent: Sep. 20, 2011

(54) ORGANIC LAYERS FOR TUNABLE OPTICAL DEVICES

(75) Inventors: Andreas Hampp, Santa Barbara, CA (US); Justin G. Wehner, Santa Barbara, CA (US)

(73) Assignee: Raytheon Company, Waltham, MA (US)

( * ) Notice: Subject to any disclaimer, the term of this patent is extended or adjusted under 35 U.S.C. 154(b) by 83 days.

(21) Appl. No.: 12/354,234

(22) Filed: Jan. 15, 2009

(65) Prior Publication Data

US 2010/0177371 A1 Jul. 15, 2010

(51) Int. Cl.
*G02F 1/03* (2006.01)
(52) U.S. Cl. ........................... 359/245; 359/260
(58) Field of Classification Search ............ 359/245, 359/248, 254, 259, 260, 269, 280, 283, 285, 359/288, 308; 349/89, 90, 198
See application file for complete search history.

(56) References Cited

U.S. PATENT DOCUMENTS

| | | | | |
|---|---|---|---|---|
| 4,291,950 A * | 9/1981 | Pepper et al. | ................. | 359/252 |
| 6,545,739 B1 * | 4/2003 | Matsumoto et al. | .......... | 349/198 |
| 6,856,461 B2 * | 2/2005 | Curtis | ........................... | 359/573 |
| 6,950,245 B2 * | 9/2005 | Nishioka et al. | ............. | 359/721 |
| 6,970,488 B2 * | 11/2005 | Spoonhower et al. | ......... | 372/39 |
| 7,535,626 B2 * | 5/2009 | Kosaka et al. | ................ | 359/319 |

OTHER PUBLICATIONS

Wang, C., et al., "Electrochromic Nanocrystal Quantum Dots," Science, www.sciencemag.org, vol. 291, 4 pages, 2389-2392, Mar. 23, 2001.

Wang, C., et al., "Electrochromic semiconductor nanocrystal films," Applied Physics Letters, vol. 80, No. 1, 3 pages (Received Jun. 21, 2001; accepted for publication Oct. 24, 2001), pp. 4-6, Jan. 7, 2002.

Cooper, K.M., et al., "Physiological color change in squid iridophores, II. Ultrastructural mechanisms in *Lolliguncula brevis*," Cell and Tissue Research, Cell Tissue Res 259:15-24, 10 pages (accepted Sep. 9, 1989), pp. 15-24, 1990.

Antoszewski, J., et al., "A Monolithically Integrated HgCdTe Short-Wavelength Infrared Photodetector and Micro-Electro-Mechanical Systems-Based Optical Filter," Journal of Electronic Materials, vol. 34, No. 6, ProQuest Science Journals, 6 pages, 716-721, Jun. 2005.

Antoszewski, J., et al., "A monolithically integrated HgCdTe SWIR photodetector and tunable MEMS-based optical filter," Infrared Technology and Applications XXXI, Proce. of SPIE vol. 5783, 0277-786X/05, 9 pages, pp. 719-727, 2005.

Lindle, J.R., et al., "Negative luminescence from mid-wave infrared HgCdTe diode arrays," Elsevier, Physica E Low-Dimensional Systems & Nanostructures, Proceedings of the 11th International Conference on Narrow Gap Semiconductors, vol. 20, issues 3-4, ISSN 1386-9477, 6 pages, pp. 557-562, Jan. 2004.

\* cited by examiner

*Primary Examiner* — William C Choi
*Assistant Examiner* — Tuyen Tra
(74) *Attorney, Agent, or Firm* — Baker Botts L.L.P.

(57) ABSTRACT

A method for manipulating light comprises receiving an incoming beam of light at a tunable optical device, the tunable optical device comprising an organic material having an optical property that can be selectively varied under the influence of an external bias. The method further comprises applying a selected external bias to the tunable optical device to change an optical property of the tunable optical device. The method also comprises controlling an optical property of a beam of light exiting the tunable optical device as a result of the selected external bias.

28 Claims, 5 Drawing Sheets

ORGANIC LAYERS FOR TUNABLE OPTICAL DEVICES

TECHNICAL FIELD

This disclosure relates in general to optical devices and more particularly to optical devices with tunable organic layers.

OVERVIEW

Optical devices can be used in a variety of application to manipulate electromagnetic waves. For example, optical filters can selectively transmit light, such as blocking certain wavelengths while allowing others. Tunable filters can be realized by using microelectromechanical systems ("MEMS"). As another example, apertures and shutters can be used to control the admission of light into a system.

Certain biological systems exist that can change one or more physical properties of an organic layer. For example, chromatophores are pigment-containing and light-reflecting cells. Some organisms have pigment cells called iridiphores that can reflect light using plates of crystalline chemochromes. When illuminated, iridiphores generate iridescent colors because of the diffraction of light within the stacked plates. Some species have the ability to translocate the pigment inside chromatophores, resulting in a change in color. Other organic materials may exhibit an altered physical property when influenced by an outside stimulus.

SUMMARY OF EXAMPLE EMBODIMENTS

In accordance with one embodiment of the present disclosure, a method for manipulating light comprises receiving an incoming beam of light at a tunable optical device, the tunable optical device comprising an organic material having an optical property that can be selectively varied under the influence of an external bias. The method further comprises applying a selected external bias to the tunable optical device to change an optical property of the tunable optical device. The method also comprises controlling an optical property of a beam of light exiting the tunable optical device as a result of the selected external bias.

In accordance with another embodiment of the present disclosure, a system comprises a tunable optical device operable to receive an input of light and produce an output, the tunable optical device comprising an organic material. The system further comprises a controller operable to provide a stimulus to the organic material, the stimulus operable to vary a property of the organic material and affect an optical characteristic of light passing through the optical material.

In accordance with yet another embodiment of the present disclosure, a tunable optical device comprises an organic material comprising an optical property. The device further comprises a receiver coupled to the organic material and operable to receive a stimulus and pass the stimulus to the organic material, wherein the optical property of the organic material is operable to be selectively changed in response to a stimulus being applied to the organic material.

Numerous technical advantages are provided according to various embodiments of the present disclosure. Particular embodiments of the disclosure may exhibit none, some, or all of the following advantages depending on the implementation. In certain embodiments, organic layers may be used to adjust the optical properties of the optical device to provide a variable or tunable device. In other embodiments, organic layers can be used to provide certain functionality at a lower cost than existing systems. In other embodiments, organic layers can be applied on-pixel, on-chip, or can be located anywhere in an optical path.

Other technical advantages of the present disclosure will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present disclosure and its advantages, reference is now made to the following description, taken in conjunction with the accompanying drawings, in which.

DETAILED DESCRIPTION OF EXAMPLE EMBODIMENTS

Some organic materials may comprise one or more physical properties that changes with the application of a stimulus to the material. For example, some organic materials may exhibit a change in thickness, density, or index of refraction when an external stimulus, such as a voltage or a current, is applied. Organic materials such as these may be used in certain optical systems to create devices or other components that can modify the capabilities or operation of the system.

Organic materials can comprise polymers in certain embodiments. Polymers may be comprised of repeating structural units. The structure of any given polymer may have an influence on its properties. An external stimulus applied to a polymer may alter a physical property of the polymer. An external stimulus could also alter the geometric arrangement of atoms or groups of atoms in a polymer. In other embodiments, organic materials may comprise oligomers. An organic material may also comprise a high molecular weight material in some embodiments.

Figure 1:
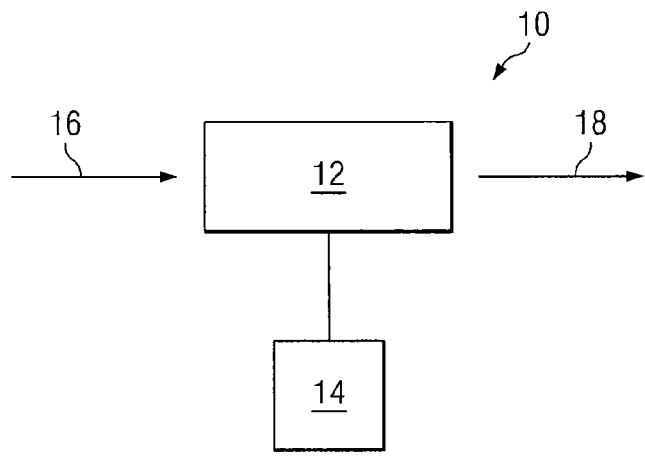
FIG. 1 illustrates a system for controlling a tunable optical device.

FIG. 1 illustrates a system 10 for controlling a tunable optical device 12. System 10 comprises optical device 12, control 14, input light 16, and output light 18. System 10 may comprise a component of a larger optical system, such as an optical communication system, an optical filtering system, or an optical sensing system, among others. Input light 16 comprises an input of radiation comprising one or more wavelengths. Input light 16 could comprise visible light, infrared light, ultraviolet light, or any other suitable input. Device 12 is operable to perform an optical function on input light 16. As one example, device 12 could comprise a filter that passes one or more wavelengths or bands of wavelengths of input light 16. Other examples include optical shutters, tunable mirrors, apertures, switches, and tunable optical resistors, among others. The light passed by device 12 comprises output light 18.

Device 12 could comprise an organic material with a physical property that changes with the application of a stimulus to the material. For example, if device 12 comprises a filter, control 14 could provide a stimulus to the organic material that alters the wavelengths passed by the filter. The stimulus provided by control 14 could be a voltage, current, magnetic field, optical flux, or any other stimulus operable to alter a physical property of the organic material. Control 14 could provide a constant stimulus or a varying stimulus in certain applications. The stimulus may be applied at varying times in certain applications. Control 14 can comprise any suitable mechanism for providing a stimulus, such as a machine, computer system, microprocessor, electronic or optical circuit, or any other device. The stimulus could be applied indirectly to the organic material through another material, such as a bias applicator or a receiver on device 12, or applied directly to the organic material, or applied in any other suitable manner. The bias applicator or receiver may apply all or a portion of the stimulus to the organic material. Although example FIG. 1 depicts controller 14 as physically separate from device 12, controller 14 could be integrated within device 12.

Figure 2A:
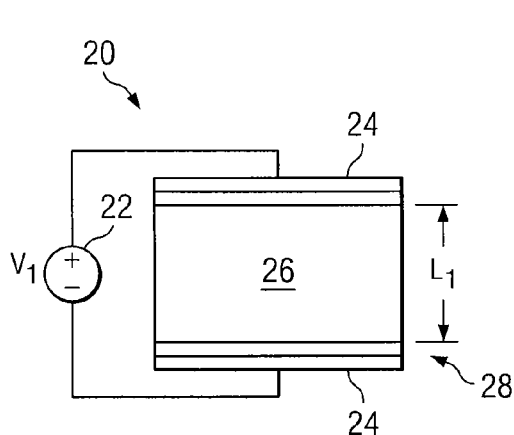
FIGS. 2A and 2B illustrate an example embodiment of an optical device comprising an organic material.
Figure 2B:
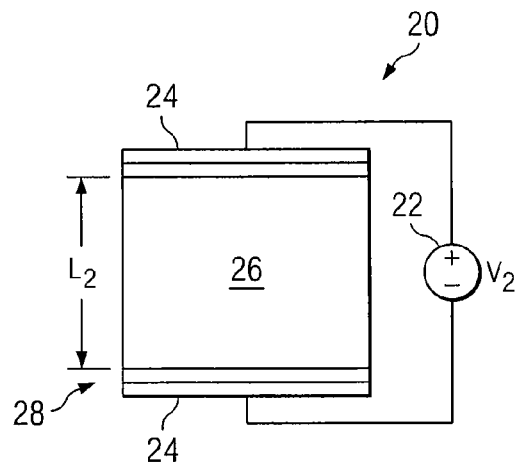

FIGS. 2A and 2B illustrate an example embodiment of an optical device comprising an organic material that exhibits a change in thickness with the application of a stimulus. In FIGS. 2A and 2B, like numbers refer to like components. Referring to FIG. 2A, system 20 comprises an optical device 28 comprising one or more mirrors 24 and a tunable spacer 26. Device 28 could comprise, for example, a Fabry-Perot interferometer, or other optical device capable of being tuned. Tunable spacer 26 could comprise an organic material comprising a physical property that changes with the application of a stimulus. In this example, the thickness of tunable spacer 26 could change with an applied voltage from voltage source 22, although other properties could be controlled using this or other stimuli. This is true with respect to each of the example embodiments described below. In FIG. 2A, voltage source 22 is configured to apply a voltage $V_1$ to optical device 28. The voltage can be applied in any suitable manner and to any suitable location on optical device 28. When voltage $V_1$ is applied in this example, tunable spacer 26 comprises a thickness of $L_1$.

In FIG. 2B, voltage source 22 applies a voltage $V_2$ to optical device 28. Voltage $V_2$ is operable to adjust the thickness of tunable spacer 26 to $L_2$. The change in thickness of tunable spacer 26 between $L_1$ and $L_2$ may alter an optical property of device 28. For example, optical device 28 may pass one set of wavelengths when tunable spacer 26 comprises a length $L_1$, but pass a different set of wavelengths when tunable spacer 26 comprises a length $L_2$. The application of a stimulus to optical device 28 can thus alter an optical property of optical device 28 when optical device 28 utilizes an organic material.

Figure 3A:
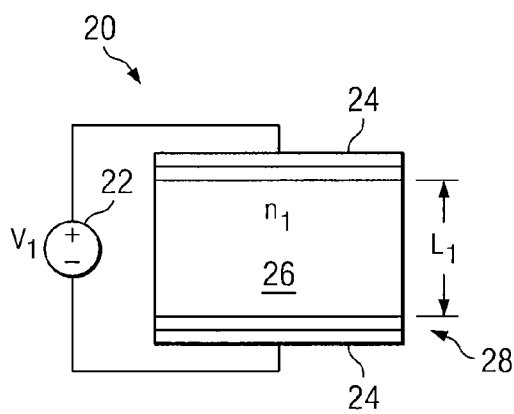
FIGS. 3A and 3B illustrate another example embodiment of an optical device comprising an organic material.
Figure 3B:
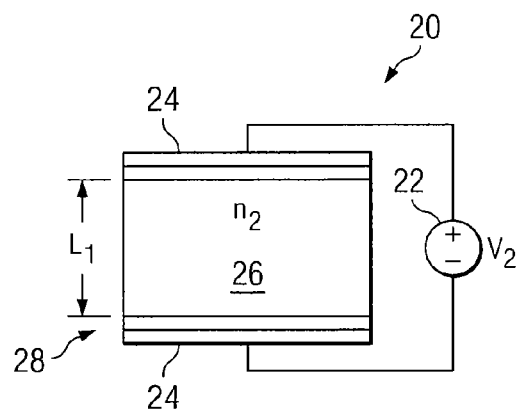

FIGS. 3A and 3B illustrate an example embodiment of an optical device comprising an organic material that exhibits a change in its index of refraction with the application of a stimulus. In FIGS. 3A and 3B, like numbers refer to like components. Referring to FIG. 3A, system 20 comprises an optical device 28 comprising one or mirrors 24 and a tunable spacer 26. Tunable spacer 26 could comprise an organic material comprising a physical property that changes with the application of a stimulus. In this example, the index of refraction of tunable spacer 26 could change with an applied voltage from voltage source 22. Voltage source 22 is configured to apply a voltage $V_1$ to optical device 28. The voltage can be applied in any suitable manner and to any suitable location on optical device 28. When voltage $V_1$ is applied in this example, tunable spacer 26 comprises a thickness of $L_1$ and an index of refraction of $n_1$.

In FIG. 3B, voltage source 22 applies a voltage $V_2$ to optical device 28. Voltage $V_2$ is operable to adjust the index of refraction of tunable spacer 26 to $n_2$. The change in the index of refraction of tunable spacer 26 between $n_1$ and $n_2$ may alter an optical property of device 28. In this example, the thickness of tunable spacer 26, $L_1$, is approximately the same when $V_1$ and $V_2$ are applied. The change in the index of refraction can alter one or more optical properties of optical device 28.

Figure 4A:
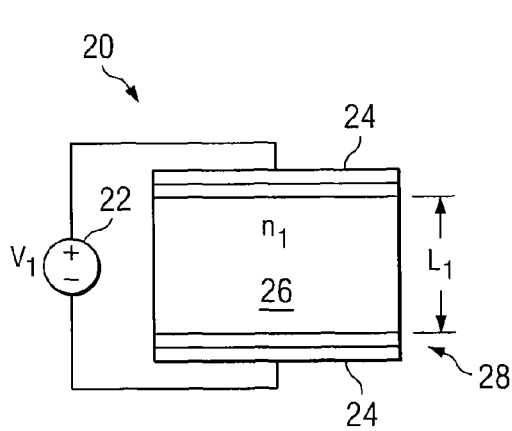
FIGS. 4A and 4B illustrate another example embodiment of an optical device comprising an organic material.
Figure 4B:
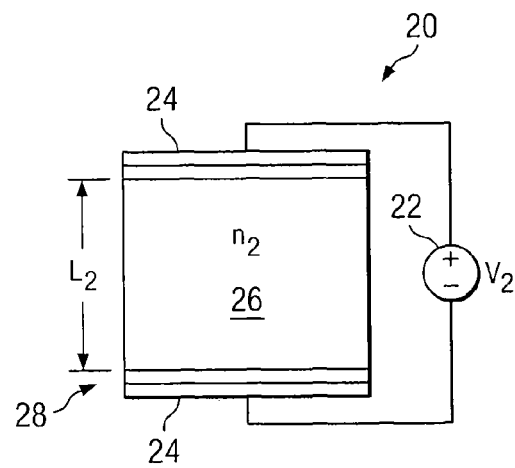

FIGS. 4A and 4B illustrate an example embodiment of an optical device comprising an organic material that exhibits a change in its thickness and in its index of refraction with the application of a stimulus. In FIGS. 4A and 4B, like numbers refer to like components. Referring to FIG. 4A, system 20 comprises an optical device 28 comprising one or mirrors 24 and a tunable spacer 26. Tunable spacer 26 could comprise an organic material comprising a physical property that changes with the application of a stimulus. In this example, the thickness and the index of refraction of tunable spacer 26 could change with an applied voltage from voltage source 22. Voltage source 22 is configured to apply a voltage $V_1$ to optical device 28. The voltage can be applied in any suitable manner and to any suitable location on optical device 28. When voltage $V_1$ is applied in this example, tunable spacer 26 comprises a thickness of $L_1$ and an index of refraction of $n_1$.

In FIG. 4B, voltage source 22 applies a voltage $V_2$ to optical device 28. Voltage $V_2$ is operable to adjust the index of refraction of tunable spacer 26 to $n_2$. Voltage $V_2$ is further operable to adjust the thickness of tunable spacer 26 to $L_2$. The change in the thickness and/or the change in the index of refraction of tunable spacer 26 may alter an optical property of device 28.

Figure 5:
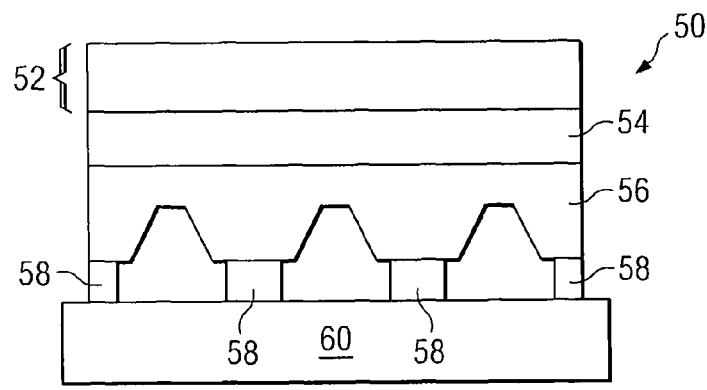
FIG. 5 illustrates an example embodiment of an optical device utilizing an organic layer for a shutter application.

FIG. 5 illustrates an example embodiment of an optical device utilizing an organic layer for a shutter application. Optical shutters can be used to control the transmission of light in an optical path. Optical shutters can rapidly open and close an optical path, which can modulate beams of light. In this embodiment, shutter 50 comprises a tunable organic layer 52, substrate 54, mercury-cadmium-telluride layer 56, indium bumps 58, and silicon read-out circuit 60. In other embodiments, elements 54, 56 and 58 can comprise any other material suitable for use in an optical device. For example, in some embodiments substrate 54 can comprise silicon, cadmium-zinc-telluride, or any other suitable material. As another example, in other embodiments layer 56 can comprise any other detector material, such as indium antimonide, a strained layer superlattice, a lead chalcogenide, or any other suitable material. Any other suitable material may also be present in other embodiments of shutter 50.

Organic layer 52 of shutter 50 in some embodiments can be adjusted from opaque to transparent when under the influence of an outside stimulus. When transparent, organic layer 52 may allow light of one or more wavelengths or band of wavelengths to reach another component, such as a photovoltaic detector. When opaque, organic layer 52 may block light of one or more wavelengths or band of wavelengths. The outside stimulus that changes organic layer 52 from opaque to transparent can comprise any suitable type of stimulus, including voltage, current, magnetic field, optical flux, or other stimulus operable to affect a change to an optical property of an organic material.

In some embodiments, organic layer 52 may be used as an antireflective layer coating. An antireflective layer coating may be used to reduce reflection on the surface of a lens or other optical device. Layer 52 may comprise a refractive index that can be adjusted with the application of a stimulus in some embodiments. A wavelength or range of wavelengths affected by the antireflective layer coating may also be adjusted with the application of a stimulus in certain embodiments.

Figure 6:
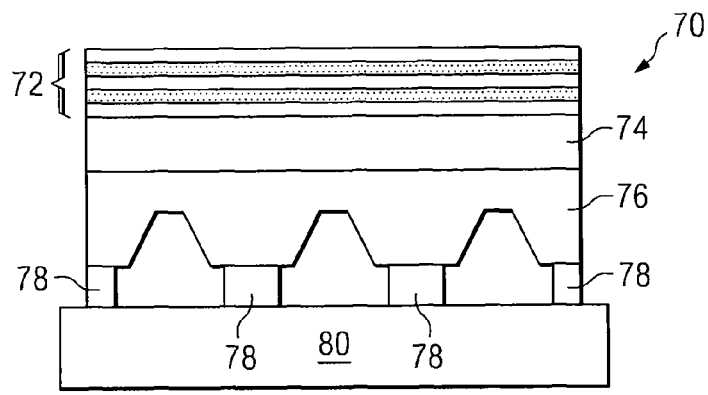
FIG. 6 illustrates an example embodiment of an optical device utilizing an organic layer for a tunable mirror.

FIG. 6 illustrates an example embodiment of an optical device utilizing an organic layer for a tunable mirror. A tunable mirror may be used to reflect light or could comprise an antireflective layer. A tunable mirror may also reflect light of a certain wavelength or band of wavelengths. A stimulus applied to a tunable mirror comprising one or more organic layers may change the wavelength or band of wavelengths reflected by the mirror, or may change the mirror from reflective to antireflective, or vice versa. Mirror 70 comprises tunable organic layers 72, substrate 74, mercury-cadmium-telluride layer 76, indium bumps 78, and silicon read-out circuit 80. In other embodiments, elements 74, 76, and 78 can comprise any other material suitable for use in an optical device. For example, in some embodiments substrate 74 can comprise silicon, cadmium-zinc-telluride, or any other suitable material. As another example, in other embodiments layer 76 can comprise any other detector material, such as indium antimonide, a strained layer superlattice, a lead chalcogenide, or any other suitable material. Mirror 70 can comprise any suitable number of layers 72. Tunable organic layers 72 in mirror 70 may be adjusted separately or together in any combination.

Figure 7:
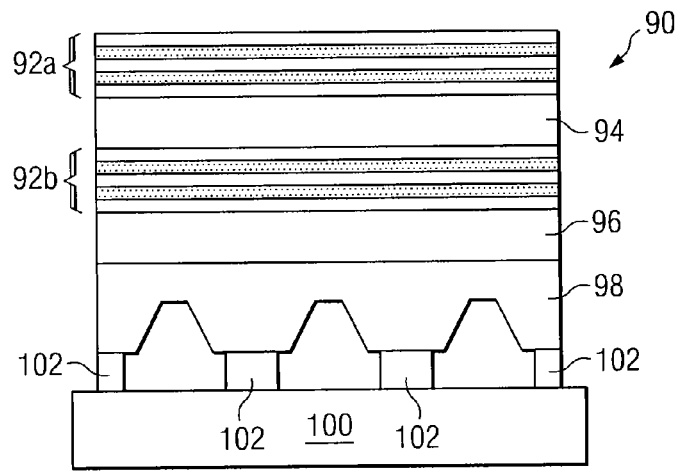
FIG. 7 illustrates an example embodiment of an optical device comprising a tunable spacer in a multi-layer filter application.

FIG. 7 illustrates an example embodiment of an optical device comprising a tunable spacer 94 in a multi-layer filter application. Multi-layer filter 90 comprises mirrors 92a and 92b, tunable spacer 94, substrate 96, mercury-cadmium-telluride layer 98, indium bumps 102, and silicon read-out circuit 100. In other embodiments, elements 96, 98, and 102 can comprise any other material suitable for use in an optical device. For example, in some embodiments substrate 96 can comprise silicon, cadmium-zinc-telluride, or any other suitable material. As another example, in other embodiments layer 98 can comprise any other detector material, such as indium antimonide, a strained layer superlattice, a lead chalcogenide, or any other suitable material. Multi-layer filter 90 may be reflective or anti-reflective in certain embodiments. Tunable spacer 94 may comprise an organic material, and may allow a certain wavelength or band of wavelengths to be reflected by filter 90. A stimulus applied to tunable spacer 94 may alter the wavelength or band of wavelengths that are reflected. In certain other embodiments, one or more mirrors in multi-layer filter 90 may also be tunable. In those embodiments, tunable spacer 94 may be tuned by application of a stimulus, and one or more mirrors 94 may also be tuned by the stimulus or by another stimulus.

Figure 8A:
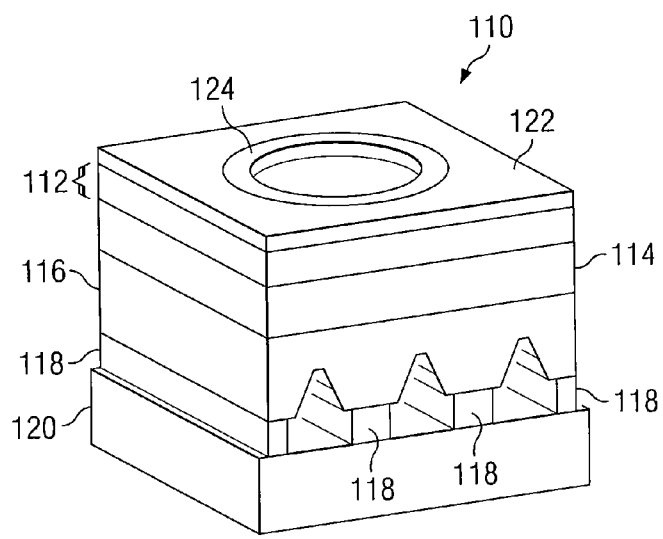
FIGS. 8A and 8B illustrate an example embodiment of an optical device comprising a tunable spacer in an aperture application.
Figure 8B:
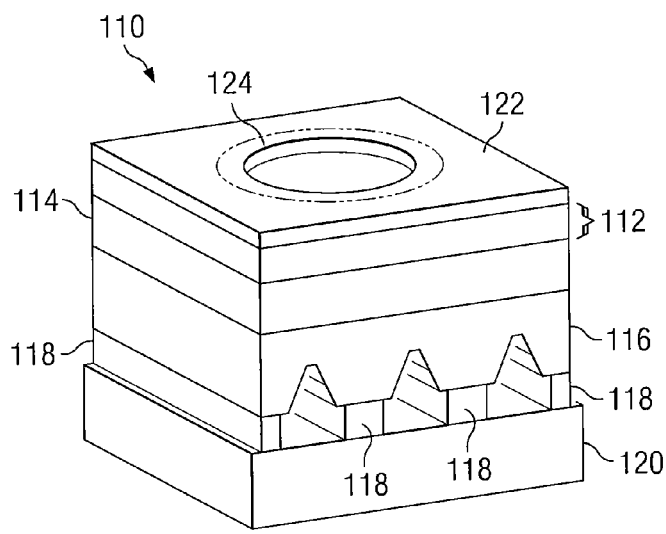

FIGS. 8A and 8B illustrate an example embodiment of an optical device comprising a tunable ring 124 in an aperture application. In the figures, like numbers refer to like components. Aperture 110 comprises mirror 112, substrate 114, mercury-cadmium-telluride layer 116, indium bumps 118, and silicon read-out circuit 120. In other embodiments, elements 114, 116, and 118 can comprise any other material suitable for use in an optical device. For example, in some embodiments substrate 114 can comprise silicon, cadmium-zinc-telluride, or any other suitable material. As another example, in other embodiments layer 116 can comprise any other detector material, such as indium antimonide, a strained layer superlattice, a lead chalcogenide, or any other suitable material.

Aperture 110 further comprises ring 122 and tunable ring 124. Ring 122 may allow light to reach mirror 112 by passing through the center of ring 122. Ring 122 may or may not be tunable in certain embodiments. As shown in FIG. 8A, tunable ring 124 may comprise a tunable organic material. The organic material of tunable ring 124 may be transparent in certain applications. When tunable ring 124 is transparent, light may pass through tunable ring 124 to mirror 112, and the diameter of the aperture is approximately the diameter of ring 122. As shown in FIG. 8B, a stimulus may be applied to the organic material comprising tunable ring 124. When the stimulus is applied, tunable ring 124 may change from transparent to opaque. When ring 124 becomes opaque, light only reaches mirror 112 by passing through the center of ring 124, thus reducing the diameter of the aperture and reducing the amount of light that reaches mirror 112. Thus, a tunable organic material may be used in an aperture application.

In other embodiments, a structure similar to that of ring 122 and tunable ring 124 may be used to adjust the amount of light that reaches another device, such as an optical device. Ring 122 and tunable ring 124 may comprise all or part of a component inserted in an optical path and operable to adjust the amount of light traveling the optical path. A stimulus may be applied to tunable ring 124 to change the organic material of tunable ring 124 from transparent to opaque to reduce the amount of light traveling the optical path. In other embodiments, a stimulus may be applied to tunable ring 124 to change the organic material from opaque to transparent to increase the amount of light traveling the optical path. Other configurations of components may be used to alter the amount of light traveling the optical path.

Figure 9:
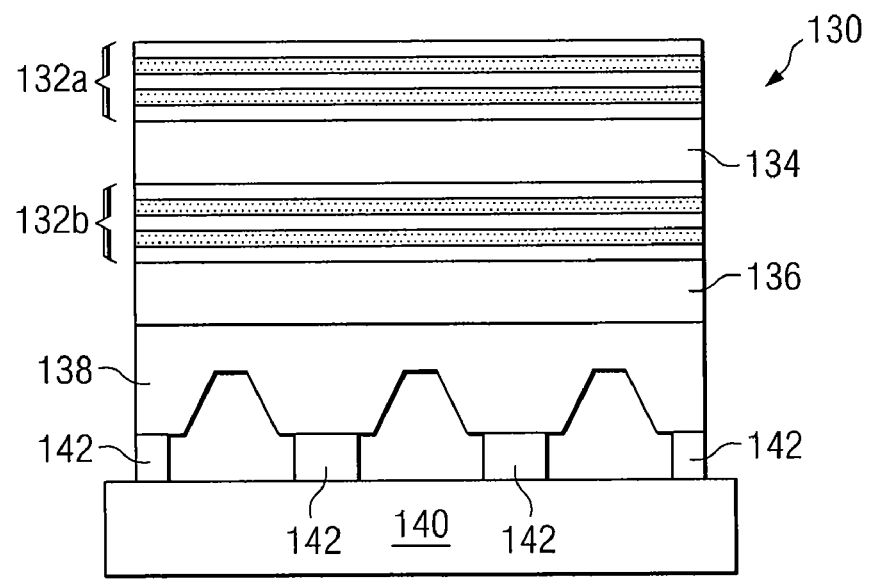
FIG. 9 illustrates an example embodiment of an optical device with an organic layer distributed relatively uniformly across a chip.

FIG. 9 illustrates one example embodiment of an optical device 130 with an organic layer distributed relatively uniformly across a chip. Device 130 comprises mirrors 132a and 132b, tunable spacer 134, substrate 136, mercrury-cadmium-telluride layer 138, indium bumps 142, and silicon read-out circuit 140. In other embodiments, elements 136, 138, and 142 can comprise any material suitable for use in an optical device. For example, in some embodiments substrate 136 can comprise silicon, cadmium-zinc-telluride, or any other suitable material. As another example, in other embodiments layer 138 can comprise any other detector material, such as indium antimonide, a strained layer superlattice, a lead chalcogenide, or any other suitable material. Device 130 could comprise, as one example, a multi-layer filter. However, distributing an organic layer relatively uniformly across a chip may be accomplished with any suitable optical device.

Figure 10:
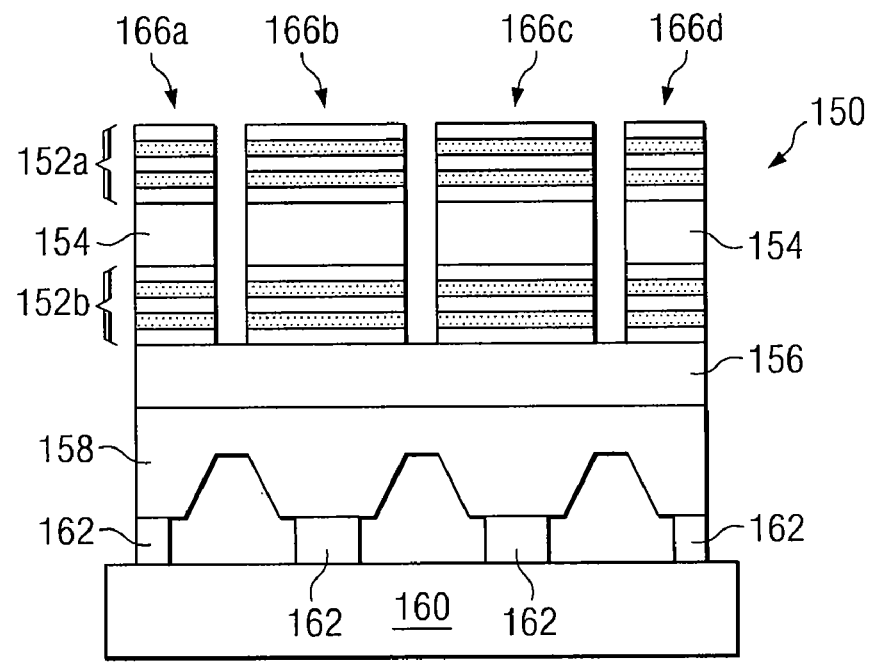
FIG. 10 illustrates an example embodiment of an optical device with an organic layer distributed pixel by pixel.

FIG. 10 illustrates one example embodiment of an optical device 150 with an organic layer distributed pixel by pixel. Device 150 comprises mirrors 152a and 152b, tunable spacer 154, substrate 156, mercury-cadmium-telluride layer 158, indium bumps 162, and silicon read-out circuit 160. In other embodiments, elements 156, 158, and 162 can comprise any material suitable for use in an optical device. For example, in some embodiments substrate 156 can comprise silicon, cadmium-zinc-telluride, or any other suitable material. As another example, in other embodiments layer 158 can comprise any other detector material, such as indium antimonide, a strained layer superlattice, a lead chalcogenide, or any other suitable material. Device 150 could comprise, as one example, a multi-layer filter. Device 150 also includes pixels 166a-166d, referred to as pixels 166. With an organic layer distributed pixel by pixel, pixels 166 may be stimulated by an applied stimulus separately or in groups of pixels comprising any suitable number of pixels. For example, a stimulus comprising a voltage may be applied to a specific subset of pixels 166 so that only those pixels can be tuned via the application of the stimulus. Stimuli can be applied pixel by pixel, or to any subset of pixels. This can allow specific regions of the tunable optical device to be controlled.

Figure 11:
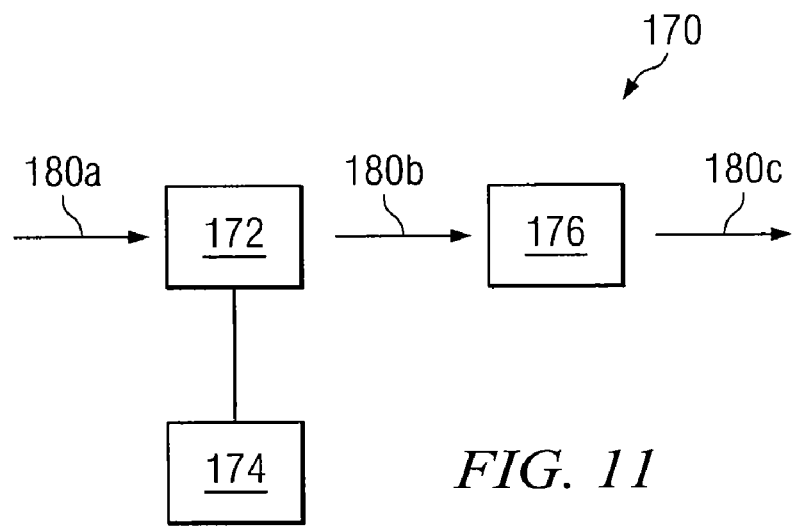
FIG. 11 illustrates a system comprising a tunable organic material in an optical path.

FIG. 11 illustrates a system 170 comprising a tunable organic material in an optical path. System 170 comprises tunable organic material 172, controller 174, and optical device 176. System 170 further comprises optical path 180, comprising paths 180a, 180b, and 180c in this embodiment. Light traveling optical path 180 may comprises visible or non-visible light. Optical device 176 may comprise any suitable type of optical device. Controller 174 may be operable to provide any suitable type of stimulus to organic material 172, such as voltage, current, magnetic field, optical flux, or any other stimulus operable to alter a physical property of the organic material. As one example, organic material 172 may operate to pass a specific wavelength or band of wavelengths of light traversing optical path 180a. Controller 174 may apply a stimulus to organic material 172 to alter the wavelength or wavelengths passed by organic material 172. The wavelengths that are passed by organic material 172 may then traverse optical path 180b to optical device 176. Optical device 176 may perform an optical function on light entering the device. In some embodiments, light may then continue traversing the optical path along optical path 180c.

In other embodiments, optical path 180 may comprise any number of instances of organic material 172 in the optical path. System 170 may also comprise any suitable number of controllers 174, each of which may apply stimuli to one or more organic materials 172. Any number of optical devices 176 may also be present in other embodiments. Further, multiple optical paths may be present in other embodiments.

Figure 12:
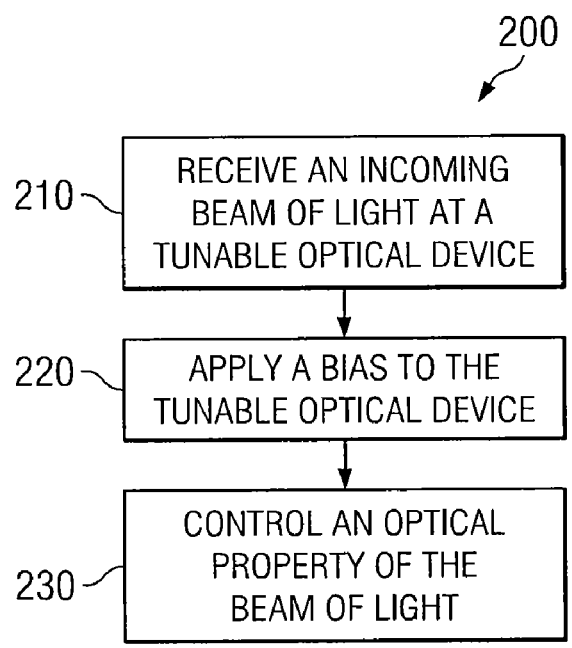
FIG. 12 illustrates an example method of tuning an optical device using a tunable organic material.

FIG. 12 illustrates an example method 200 of tuning an optical device using a tunable organic material. The steps illustrated in FIG. 12 may be combined, modified, or deleted where appropriate. Additional steps may also be added to the example operation. Furthermore, the described steps may be performed in any suitable order.

The example process begins with step 210. In step 210, an incoming beam of light is received at a tunable optical device. The tunable optical device in step 210 comprises a tunable organic material, such as a polymer, that can receive a stimulus that alters a physical property of the organic material. The tunable optical device may comprise any suitable type of optical device, such as a filter, mirror, or shutter. The tunable organic material may be situated in any suitable location on the optical device.

In step 220, a bias is applied to the tunable optical device. Any suitable type of controller or bias applicator may be used to apply the bias to the tunable optical device. The bias may comprise a stimulus in the form of a voltage, current, magnetic field, optical flux, or any other stimulus operable to alter a physical property of the organic material. As one example, a voltage may be applied to the organic material on the optical device to alter the width of the organic material, which in turn may alter an optical property of the organic material.

In step 230, an optical property of the incoming beam of light is controlled. The application of the bias to the organic material allows the optical device to perform a function on the beam of light. For example, the optical device may comprise a filter that passes a specific wavelength or band of wavelengths and blocks other wavelengths. Or in another embodiment, the optical device may comprise a tunable mirror that reflects a specific wavelength or band of wavelengths and absorbs other wavelengths. Any suitable function may be performed on the beam of light. The function performed on the beam of light may be altered by the application of the bias. For example, application of a bias may alter the wavelength or band of wavelengths affected by the optical function performed by the optical device.

Although the present disclosure has been described with several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for manipulating light, comprising:
receiving an incoming beam of light at a tunable aperture, the tunable aperture comprising:
a first layer comprising a round hole, the round hole having a first diameter; and
a tunable ring embedded in the first layer concentric with the round hole, the tunable ring being defined by an inner diameter and an outer diameter larger than the inner diameter, the inner diameter of the tunable ring being the same as the first diameter of the round hole, the tunable ring comprising an organic material;
controlling an amount of the incoming beam of light that passes through the aperture by:
applying a selected external bias to the organic material of the tunable ring to change the tunable ring from transparent to opaque, thereby reducing the amount of the incoming beam of light that passes through the aperture; and
removing the selected external bias to the organic material of the tunable ring to change the tunable ring from opaque to transparent, thereby increasing the amount of the incoming beam of light that passes through the aperture.

2. The method of claim 1, wherein the organic material comprises a polymer.

3. The method of claim 1, wherein the organic material comprises an oligomer.

4. The method of claim 1, wherein applying a selected bias to the organic material comprises applying the bias directly to the organic material.

5. The method of claim 1, wherein applying a selected bias to the organic material comprises applying the bias indirectly to the organic material through another material.

6. The method of claim 1, wherein applying a selected external bias to the organic material varies an index of refraction of the organic material.

7. The method of claim 1, wherein applying a selected external bias to the organic material varies a density of the organic material.

8. The method of claim 1, wherein applying a selected external bias comprises applying a voltage to the organic material.

9. The method of claim 1, wherein applying a selected external bias comprises applying a magnetic field to the organic material.

10. The method of claim 1, wherein applying a selected external bias comprises applying a current to the organic material.

11. The method of claim 1, wherein applying a selected external bias comprises applying an optical flux to the organic material.

12. The method of claim 1, wherein the incoming beam of light comprises visible light.

13. The method of claim 1, wherein the incoming beam of light comprises infrared light.

14. The method of claim 1, wherein the organic material comprises a high molecular weight material.

15. A system, comprising:
a tunable aperture operable to receive an input of light, the tunable aperture comprising:
a first layer comprising a round hole, the round hole having a first diameter; and
a tunable ring embedded in the first layer concentric with the round hole, the tunable ring being defined by an inner diameter and an outer diameter larger than the inner diameter, the inner diameter of the tunable ring being the same as the first diameter of the round hole, the tunable ring comprising an organic material;
a controller operable to control an amount of the input of light that passes through the aperture by:
applying a stimulus to the organic material of the tunable ring to change the tunable ring from transparent to opaque, thereby reducing the amount of the input of light that passes through the aperture; and
removing the stimulus to the organic material of the tunable ring to change the tunable ring from opaque to transparent, thereby increasing the amount of the input of light that passes through the aperture.

16. The system of claim 15, wherein the organic material comprises a polymer.

17. The system of claim 15, wherein applying a stimulus to the organic material varies an index of refraction of the organic material.

18. The system of claim 15, wherein applying a stimulus to the organic material varies a density of the organic material.

19. The system of claim 15, wherein applying a stimulus comprises applying a voltage to the organic material of the tunable ring.

20. The system of claim 15, wherein applying a stimulus comprises applying a current to the organic material of the tunable ring.

21. The system of claim 15, wherein applying a stimulus comprises applying a magnetic field to the organic material of the tunable ring.

22. The system of claim 15, wherein applying a stimulus comprises applying an optical flux to the organic material of the tunable ring.

23. The system of claim 15, wherein the input of light comprises visible light.

24. The system of claim 15, wherein the input of light comprises infrared light.

25. The system of claim 15, wherein the organic material comprises a high molecular weight material.

26. A tunable optical device, comprising:
a plurality of tunable pixels, each tunable pixel comprising a tunable spacer, each tunable spacer comprising an organic material; and
a receiver coupled to the organic material of each of the plurality of tunable pixels and operable to receive a stimulus and selectively control an amount of input of light that passes through the organic material of a specific subset of the plurality of tunable pixels by:
passing the stimulus to the organic material of the specific subset of the tunable pixels to change the organic material of the specific subset of the tunable pixels from transparent to opaque, thereby reducing the amount of the input of light that passes through the organic material of the specific subset of the tunable pixels; and
passing the stimulus to the organic material of the of the specific subset of the tunable pixels to change the organic material of the specific subset of the tunable pixels from opaque to transparent, thereby increasing the amount of the input of light that passes through the organic material of the specific subset of the tunable pixels.

27. The device of claim 26, wherein the stimulus changes an index of refraction of the organic material.

28. The device of claim 26, wherein receiving a stimulus comprises receiving a voltage at the receiver and passing at least a portion of the voltage to the organic material.

\* \* \* \* \*